July 1, 1941.  H. R. DEVILBISS  2,247,609
SANITARY PIPE JOINT
Filed Feb. 6, 1941
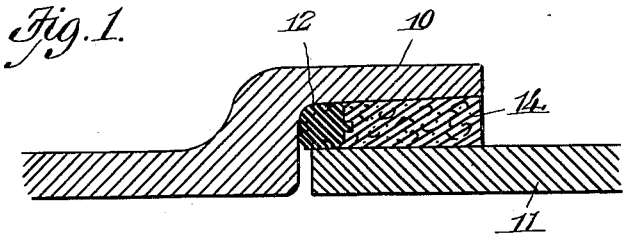
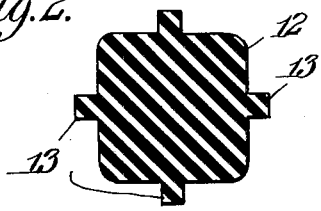
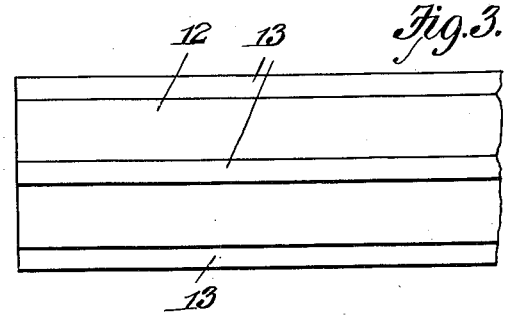
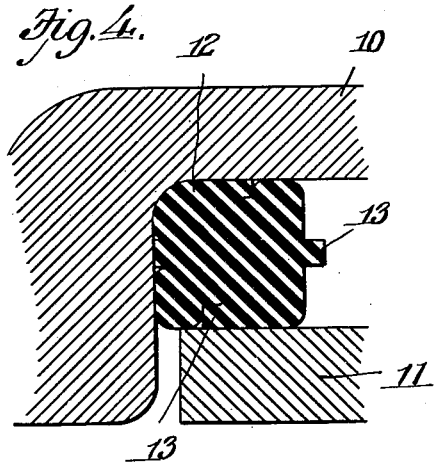
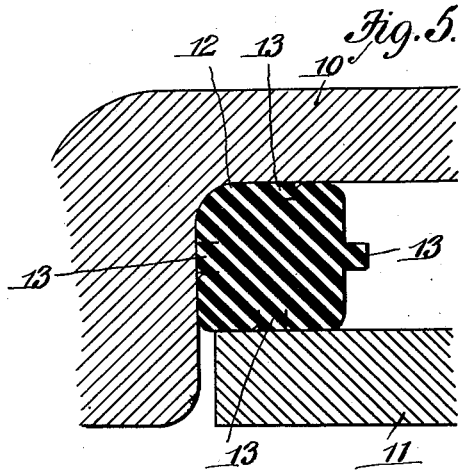
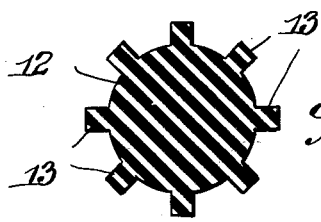
Inventor
Howard R. Devilbiss,
Attorney Patented July 1, 1941

2,247,609

UNITED STATES PATENT OFFICE 2,247,609

SANITARY PIPE JOINT

Howard R. Devilbiss, Riverdale, Md.

Application February 6, 1941, Serial No. 377,724

2 Claims. (Cl. 285—163)

This invention relates to pipe joints, having reference to a substitute for jute, hemp or other such materials usually employed in joining and sealing either water supply or sewer pipes.

A common objection to the use of jute, hemp and other vegetable materials in the sealing of water supply pipes is that quite frequently such materials contain dirt and germs which find their way into the water main and contaminate the water passing therethrough. Moreover, this vegetable material sometimes decomposes and thus tends to weaken the joint or to cause leakage. Again, the union of pipes by the use of vegetable material such as jute or hemp does not tend to a root proof connection, as hair-like roots find their way through such material and into the pipe with resultant stoppage or impairment of flow. This is particularly true where such materials are used in connection with sewer or soil pipes.

It has been proposed to substitute rubber or like resilient matter for the vegetable matter heretofore employed in pipe unions, but this has not proven successful in the accomplishment of the desired and required results. It has been found that ordinary rubber stripping of uniform lateral dimension has not been satisfactory in instances where the bell and spigot have not been truly concentric, or where either the bell or the spigot have been out-of-round. It has also been proposed to use pipe sealing rings having inwardly and outwardly projecting flanges for engagement with the bell and spigot portions to resist tendency of said sections separating and also to seal the joint against leakage. Such attempts have not proven entirely satisfactory because a precisely uniform clearance in the annular packing space is necessary for a satisfactory and entirely leak-proof joint.

It is an important object of the present invention to provide a pipe sealing element having the sanitary advantages afforded by rubber or like resilient material, which is capable of being applied to the assembled pipe sections in precisely the same manner as employed with jute or hemp, and which accommodates itself to pipe sections not truly concentric or to sections which may be distorted or out-of-round, will greatly aid in the prevention of root penetration and which will prove thoroughly satisfactory in sealing the pipes whether they be water mains containing relatively high pressure or low pressure waste lines.

Other advantages will become apparent from a complete understanding of the invention as set forth fully hereinafter and illustrated in the drawing, wherein:

Figure 1 is a fragmentary sectional view through bell and spigot ends of assembled pipes and showing the application of my sanitary packing strip, Figure 2 is a transverse sectional view through a strip embodying my invention, Figure 3 is a side elevation of a part of a strip, Figure 4 is an enlarged fragmentary sectional view showing the strip in place and as it may appear in some instances, Figure 5 is a similar view showing other positions the fins may assume, and Figure 6 is a transverse sectional view taken through a modified form of packing strip.

Referring now to the drawing, 10 represents the bell end of a pipe and 11 the enclosed or spigot end, the said bell and spigot providing between them the usual annular space for the accommodation of the packing materials or elements. As the invention is equally applicable to water or sewer lines, the pipe may be of metal, terra-cotta or other material such as are usually employed in the construction of such pipe.

The packing element of my invention comprises a ring in the form of a body 12 of transverse dimension approximately equal to the annular space between the bell and spigot sections. This body is formed of deformable or elastic material such as rubber, and is of a length sufficient to encircle the spigot end of the pipe. This body may be round or rectangular in cross section as desired, and is provided with outwardly projecting fins 13 arranged in spaced relation around the perimeter or periphery of the body and coextensive with the latter. These fins are so located upon the body as to be at diametrically opposite points upon the body, and are integral with the latter as shown. The fins are rather sturdy in size so as to not lend themselves readily to breakage, and yet possess the same degree of yieldability or resilience as the body of which they are formed. These fins are disposed in true radial relationship upon the body, and when the latter is forced against the seat of the bell by the usual packing instruments, those fins engaging the walls of the spigot and bell will deform themselves into the body of the ring and thus provide and maintain a tight seal between the two sections. After the ring has been applied and tightly positioned in the annular space, the remainder of such space may be filled in the usual way with the usual compounds which may be applied hot or cold in accordance with the approved or desired practice. The sealing compound thus tends to hold the packing ring in place and to perform the same functions as when used in connection with jute, hemp or other packing materials.

It is quite likely that in forcing the packing ring into the seat of the bell, the ring may tend to "roll" in some parts and to slide in others. In such cases, the fins upon opposite sides of the ring may assume different positions. For instance, they may be both deformed in the same general direction as shown in Figure 1; they may deform themselves in opposite directions as shown in Figure 4, or one or the other or both may be pressed laterally inward of the body as shown in Figure 5. In any event, the seal is perfected, and the tight frictional contact between the fins and the adjacent pipe surfaces not only seals against the flow of liquid but also prevents hair-like roots from gaining access to the interior of the pipe.

By constructing the ring in such transverse dimension that the body thereof is substantially equal to the breadth of the annular space between the bell and spigot, regardless of its position in the space, a tight seal between the fins and the adjacent pipe surfaces is assured, whether or not the pipe sections are truly concentric, or whether or not one or both of such sections be out-of round. The use of a seal ring of my invention secures the sanitary benefits incident to the use of rubber or like resilient material while at the same time assures a liquid proof and root resisting union between the sections whether they be metal or composition metal. The elasticity of the ring and the fins thereof, with the ability of the latter to flex either forwardly, rearwardly or inwardly, assures a tight union between the ring and the adjacent pipe surface notwithstanding undulations or inequalities in the surfaces of the latter.

In Figure 6 of the drawing there is shown a slight modification of the strip, wherein it assumes a circular shape in cross section with a plurality of fins radiating from its periphery and disposed lengthwise of the strip. A strip so constructed assures the engagement of fins with the opposing pipe surfaces regardless of the position the strip may assume in the space.

Having thus described my invention, what I claim as new and useful is:

1. A fluid seal pipe joint assembly comprising inner and outer pipe members defining between them an annular space, a deformable packing ring in said space, said ring having a transverse dimension substantially equal to the breadth of said space, and fins integral with said ring normally projecting outwardly from opposite sides of said ring but adapted to be deformed into the confines of the body of the ring when the latter is properly positioned between said pipe members.

2. A fluid seal pipe joint assembly comprising inner and outer pipe members defining between them an annular space, a resilient deformable packing ring in said space, said ring having a transverse dimension substantially equal to the breadth of said annular space, laterally extending fins integral with and projecting from said ring, said fins spaced from one another upon said ring and extending throughout the circumference thereof, said fins deformable into the body of said ring and acting to displace the material thereof upon application of pressure to said ring and upon contact of said fins with said inner and outer pipe members.

HOWARD R. DEVILBISS.